Figure 1:
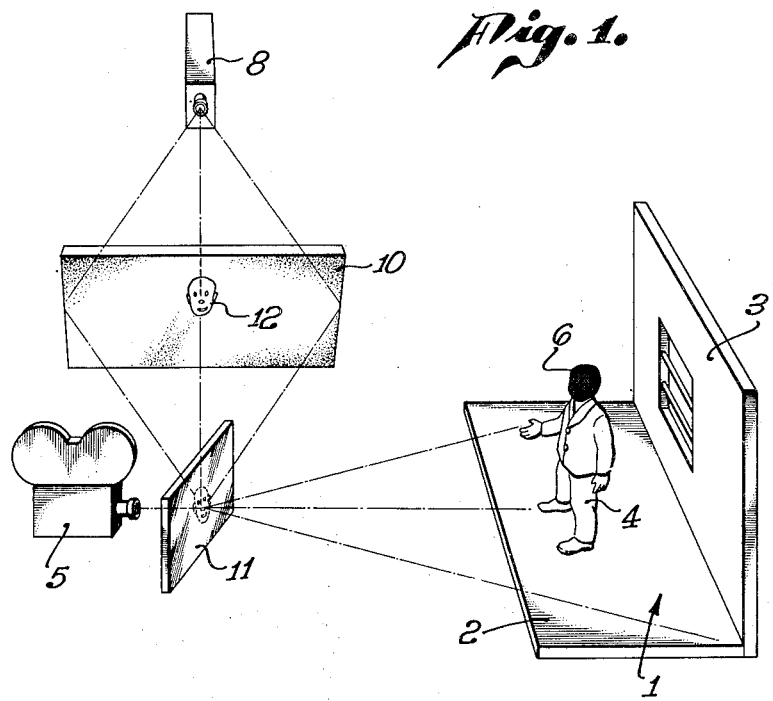

Patented Mar. 28, 1950

2,501,958

UNITED STATES PATENT OFFICE 2,501,958

METHOD OF PRODUCING MOTION PICTURES

Willis H. O'Brien, Los Angeles, Calif., assignor to Edward Nassour, Los Angeles, Calif.

Application July 23, 1945, Serial No. 606,588

6 Claims. (Cl. 88—16)

My invention relates to a method of producing motion pictures and has particular reference to a method for providing facial animation upon a model or series of models to be photographed successively in different aspects of animation.

In the art of producing motion pictures, particularly photographs of figures or models in different successive positions of postures of animation, it has heretofore been the practice to photograph upon a film strip a series of pictures of a doll or other model, each successive photograph being made with the doll or other model in a different position or phase of animation representative of the relative positions of the various parts of the model in animated action.

In the Edward Nassour Patent No. 2,310,254, issued February 9, 1943, is described one manner in which such animated motion picture can be produced as including the successive photographing of a series of successive model figures, each figure being modeled to position arms, legs and other parts of the body in different successive positions representative of the different successive phases of animation desired to be represented in the finished motion picture.

In order to produce the effect of animation of facial expression in the finished motion picture, each of the models successively photographed must have the head and face of the model sculptured to represent one of a series of successive phases of facial animation in the same manner as arms, legs and other portions of the body of the model are required to be sculptured or molded to different positions. In view of the fact that such models are usually miniatures, changes of positions of relatively large body elements such as arms, legs and the like may be readily sculptured but the production of a series of heads or faces with the various facial elements in different positions of animation is extremely difficult due to the small sizes of the models and hence previous attempts to mold or model a series of such faces or heads with the facial elements in different positions of animation have resulted in either a jerkiness in the facial expressions in the finished motion picture or there has been a lack of registry of the facial elements in the successive photographs sufficient to produce a fuzziness in the finished motion picture.

It is therefore an object of my invention to provide a method by which a single model figure may be successively photographed in different aspects of animation or a series of separate models, each representative of a different aspect of animation, and may be successively photographed before a suitable background or set and in which the facial expression and animation of such facial expression may be provided without requiring any change of facial expression upon the model to be photographed.

Another object of my invention is to provide a method for providing animation of faces and heads for figure models by producing a series of successive photographs of only the heads and facial expressions and then projecting one of said photographs at a time toward a camera employed to photograph a series of models or model positions representing different aspects of animation of the model to thereby produce a composite finished motion picture of the directly photographed model and the projected images of heads and faces therefor.

Another object of my invention is to provide a method of providing animation as set forth in the preceding paragraph wherein the images of the heads or faces of the models are so projected relative to the camera and the models and sets to be photographed by the camera that the heads and faces appear to be projected directly upon the successive models to thereby permit adjustment of the size and position of the images of the heads and faces to conform with the desired size of the model heads and to permit the accurate registry of the projected images with the space and position occupied by the actual heads of the models to be photographed.

Figure 2:
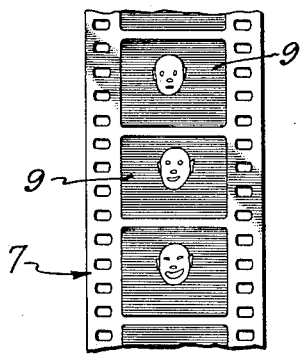

Other objects and advantages of my invention will be apparent from a study of the following specifications, read in connection with the accompanying drawing, wherein Fig. 1 is a diagrammatic perspective view of a miniature model and background set with a projector, screen, reflector and camera arranged to practice the method of my invention; and Fig. 2 is an elevational view of a portion of a film strip which may be employed in the projector shown in Fig. 1.

Referring to the drawings, I have illustrated in Fig. 1 a miniature motion picture set 1 which may comprise a platform 2 with a background wall 3 in front of which is disposed a miniature figure or model 4 to be photographed by a camera 5. As will be understood by those skilled in this art, the camera 5 is actuated in a series of intermittent steps to photograph upon successive frames of a motion picture film strip a photograph of the set 1 with either a single model 4 in different positions or aspects of animation in each successive frame or a different model 4 may be substituted in the photographing of each successive frame, each different model having various body parts in different positions relative to the positions of the same parts in the preceding model photographed so that the finished film strip will bear on successive frames an image of the model in different positions of animation. Thus the finished film when projected will show the model apparently going through the motions of the kind of animation desired. The models, as hereinbefore pointed out, are usually miniature models so that the heads and faces thereof are usually so small that it is difficult to model the facial elements in different aspects of animation on each of the successive models with sufficient clarity and sufficient accuracy of register to produce a smooth motion in the finished film strip.

I provide for the production on the finished film strip of animated facial expressions by coating the head 6 of the model 4 with a black or similar light absorbing paint or other coating to thereby cause the camera to fail to register upon its film any image of the head or face of the model.

Previous to the photographing of the model 4 on the set 1, I provide another film strip on which is registered only the head and face of another model or series of models sculptured or molded to represent different phases of animation of facial expression. Such model head is photographed on a succession of frames of the second film strip with the heads disposed in front of a black or other light absorbing background, curtain or screen. The second film strip thus has a series of successive frames, each of which bears an image of a head with the facial elements in the different positions assumed by them in successive steps of a sequence of animation of facial expression.

The second film strip, which is illustrated at 7 in Fig. 2, is then placed in a projector 8 and one of the frames 9 is projected upon a screen 10 disposed at one side of the optical axis of the lens of the camera 5, a mirror 11 being disposed in the optical axis of the camera 5 in such manner as to reflect the projected image 12 on the screen 10 into the camera lens. The mirror 11 should be a mirror of the type which will both reflect light rays directed upon its surface and also to permit vision through the mirror so that the camera 5 may simultaneously photograph the projected image 12 and the actual objects of the model 4 and set 1.

In view of the fact that the frame of each film strip 7 has registered upon it only the image of a head against a black or opaque background, the size of the image 12 may be readily adjusted by moving the projector 8 toward or away from the screen 10 to thereby vary the size of the head image to be photographed by the camera 5 to correspond to the size of the head 6 of the model 4. Likewise accurate registry of the position of the image 12 relative to the position of the actual head 6 of the model may be readily adjusted by moving the projector 8 up, down or sidewise until proper registry occurs. The operator of the camera 5 will at all times be able to view both the projected image 12 and the model 4 in registered relation to each other and hence may make such adjustment either as to size or position of the image 12 as may be necessary to cause accurate registry of the image 12 with the image of the blacked out head 6 of the model 4.

If desired, the film strip 7 may be produced by using a single model head photographed upon one frame with its facial elements in one position, the model head then being remodeled to place the facial elements in a different position and the second frame of the film strip 7 is then made by photographing the model with the facial elements in the new position. A third frame is employed to photograph the same model head with the facial elements in a still different position, etc., throughout a series of steps of animation of facial expression of the model head, or a series of identical model heads may be successively photographed, each with the facial elements in different positions representative of the phases of animation.

However, I prefer to produce the images of the heads on the film strip 7 by employing a human actor whose facial expression will change through a series of steps of a desired animation of facial expression so that by photographing the head of such actor, projected through a black or other light absorbing curtain, the series of frames 9 bearing images only of the head of the actor in successive phases of facial animation may be readily produced. Thus by the use of flexible masks on the head and face of such human actor, any desired appearance may be given to the images appearing on the film strip 7 to conform with the type or character desired for the model 4.

It will be apparent from the foregoing that smooth appearing facial animation may be provided for a miniature model without requiring the exercise of the labor and extreme carefulness of modeling which would be required to produce the desired facial expression directly upon the miniature head 6 of the miniature model 4.

It will be apparent from the foregoing that new and pleasing effects can be obtained in photographing of miniature models by providing a smooth and accurately registered facial animation for the models which is impossible to achieve by attempting to directly model or change the facial expression upon the miniature models employed and it will also be apparent that my method is equally adaptable to photography in color as it is to the production of black and white pictures since the film strip 7 may be produced as a color film, the images of which will accurately register upon a color film in the camera 5 used to directly photograph the miniature set and model.

While I have shown and described the preferred embodiment of my invention, I do not desire to be limited to any of the details of description shown and described herein, except as defined in the appended claims.

I claim:

1. The method of making an animated sequence of pictures of a model which comprises treating the head and face of the model to prevent its registration on a photographic film strip, photographing upon a film strip a series of positions one at a time of said model in different positions, each representing a phase of animation of the model, and simultaneously with the photographing of each position of the model also photographing upon the same film strip an image of a head and face conforming in size and position with the head of the model, the images for successive positions of the model having different facial expressions corresponding to the phase of model animation.

2. The method of making an animated sequence of pictures of a model, which comprises preparing a sequence of pictures of a head and face, each picture in the sequence showing a different facial expression representative of a different aspect of animation of the head and face, projecting said pictures one at a time upon a screen, photographically producing on a film strip a sequence of pictures of a model having the head thereof treated to prevent registration on said film strip, the position of said model being changed between each successive picture to a different position of animation of the model, and simultaneously with the photographing of said model in each of said pictures also photographing the screen to produce a composite picture of the model and the image of the head registered in size and position with the model.

3. The method of making an animated sequence of pictures of a model, which comprises preparing a sequence of pictures of a head and face, each picture in sequence showing a different facial expression representative of a different aspect of animation of the head and face, projecting said pictures one at a time on a screen, photographically producing on a film strip a sequence of pictures of the projected images of the head and face while simultaneously with the photographing of each image also photographing on the same film strip a model having a head treated to prevent registry of the model head on the film strip, and altering the position of the model between the photographing of each head image to position the model in a new position representing a successive step in a sequence of animation of the model.

4. The method of making an animated sequence of pictures of a model, which comprises preparing a sequence of pictures of a head and face, each picture in sequence showing a different facial expression representative of a different aspect of animation of the head and face, projecting said pictures one at a time on a screen, photographing on a film strip a sequence of pictures of the projected images of the head and face while simultaneously with the photographing of each image also photographing upon the same film strip a model having a head treated to prevent registry of the model head on the film strip, altering the position of the model between the photographing of each head image to position the model in a new position representing a successive step in a sequence of animation of the model, and adjusting the size and position of the image of the head on the screen to conform with the size and position of the model.

5. The method of producing a sequence of pictures of a model in front of a background representing animation of the model, which comprises the steps of preparing a model with body elements including a head, treating the model head to prevent its registry upon a photographic film to be used to photograph the model which head is silhouetted against the background, preparing a sequence of photographs of a head only in successive phases of facial expression, projecting the image of one of said photographs at a time on a screen and simultaneously photographing the screen and the model with the image of the head registered with the silhouette of the head of the model.

6. The method of providing animation for the heads and faces of models to be photographed in successive phases of animation of the model, which comprises making a series of pictures registering only a head and face, treating the head of the model to prevent registry of the head upon a photographic film strip, photographically producing on said film strip a sequence of pictures of the model in a series of positions each representative of one position in a sequence of movements of animation of the model, and simultaneously with the photographing of each position of the model also photographing on the film strip a screen upon which is projected one of the images of the pictures of the head only, and altering the size and position of the image on the screen to conform with the size and position of the model in each successive photographing of the model.

WILLIS H. O'BRIEN.

REFERENCES CITED

The following references are of record in the file of this patent:

UNITED STATES PATENTS

| Number | Name | Date |
| --- | --- | --- |
| 1,278,117 | Dawley | Sept. 10, 1918 |
| 1,418,033 | Sutcliffe | May 30, 1922 |
| 1,446,123 | Lederer | Feb. 20, 1923 |
| 2,091,144 | Freil | Aug. 24, 1937 |
| 2,127,656 | Terry | Aug. 23, 1938 |
| 2,150,543 | De Ybarrondo | Mar. 14, 1939 |
| 2,358,630 | Nassour | Sept. 19, 1944 |

FOREIGN PATENTS

| Number | Country | Date |
| --- | --- | --- |
| 260,574 | Great Britain | Jan. 16, 1928 |